(12) United States Patent
Lagarde et al.

(10) Patent No.: US 8,253,288 B2
(45) Date of Patent: Aug. 28, 2012

(54) ELECTRIC ACTUATOR FOR DRIVING A HOME-AUTOMATION SCREEN

(75) Inventors: Eric Lagarde, Sallanches (FR); Didier Menetrier, Marignier (FR)

(73) Assignee: Somfy SAS, Cluses (FR)

( * ) Notice: Subject to any disclaimer, the term of this patent is extended or adjusted under 35 U.S.C. 154(b) by 255 days.

(21) Appl. No.: 12/821,838

(22) Filed: Jun. 23, 2010

(65) Prior Publication Data
US 2010/0320855 A1    Dec. 23, 2010

(30) Foreign Application Priority Data

Jun. 23, 2009    (FR) ..................................... 09 54256

(51) Int. Cl.
*H02K 7/10* (2006.01)
(52) U.S. Cl. ........................................................ 310/77
(58) Field of Classification Search ............... 310/77, 310/83, 93, 98
See application file for complete search history.

(56) References Cited

U.S. PATENT DOCUMENTS

| | | | |
|---|---|---|---|
| 4,498,517 A * | 2/1985 | Mase | 160/294 |
| 4,643,282 A * | 2/1987 | Edl | 192/18 B |
| RE33,514 E * | 1/1991 | Ciolli | 192/48.92 |
| 5,399,129 A * | 3/1995 | Ciolli | 475/301 |
| 5,573,472 A * | 11/1996 | Ciolli | 475/301 |
| 5,699,847 A * | 12/1997 | Villette et al. | 160/84.02 |
| 6,433,447 B1 * | 8/2002 | Kitazawa et al. | 310/12.14 |
| 6,700,246 B1 | 3/2004 | Bruhn | |

FOREIGN PATENT DOCUMENTS

| | | |
|---|---|---|
| EP | 976909 | 2/2000 |
| EP | 1098063 | 5/2001 |
| FR | 2610668 | 8/1988 |
| WO | 2006/059840 | 6/2006 |

* cited by examiner

*Primary Examiner* — Thanh Lam
(74) *Attorney, Agent, or Firm* — Dowell & Dowell, PC

(57) ABSTRACT

This electric actuator for driving a home-automation screen is provided with a spring brake (105) comprising a helical spring (130), a friction part (140) having a friction surface (141) against which the helical spring (130) bears radially. Said brake further comprises an inlet part (110) suitable for driving the spring in rotation in a direction reducing the contact force between the spring (130) and the friction part (140), and an outlet part (120) connected to the screen.
While the screen is being lowered, the inlet part (110; 210) drives the spring (130; 230) in rotation with the contact force being decreased to the extent that the outlet part (120; 220) is released in rotation, without direct contact between the inlet part and the outlet part. The inlet part (110; 210) has at least two contact surfaces (113*a*, 113*d*; 213*b*, 217*c*) suitable for transmitting drive torque ($C_M$) for raising the screen (2), by direct contact, to at least two corresponding contact surfaces (123*a*, 123*d*; 223*b*, 227*a*) of the outlet part (120; 220).

10 Claims, 8 Drawing Sheets

ELECTRIC ACTUATOR FOR DRIVING A HOME-AUTOMATION SCREEN

TECHNICAL FIELD

The present invention relates to an electric actuator for driving a home-automation screen, of any of the following types: roller blind, shade, curtain, gate, projection screen, or garage door. The actuator of the invention is provided with a spring brake. This type of brake is more particularly adapted to tubular motors.

STATE OF THE ART

Use of a helical-spring brake in actuators for home-automation screens is known, in particular from Patent Document FR B 2 610 668. In that document, a helical spring is mounted in a friction part. At least one turn of the spring is stressed radially by a bore in the friction part. Each end of the spring forms a tab extending radially towards the inside of the spring. Each tab can be moved in order to drive the spring in rotation about its axis. The inlet part, the outlet part, and the spring are arranged specifically to obtain the following dynamic behavior: action from the inlet part situated on one side of the first tab causes the spring to move in rotation in a first direction. This movement releases the outlet part, i.e. it tends to reduce the diameter of the outside envelope of the spring. Thus, the friction between the bore in the friction part and the turns of the spring decreases, thereby reducing the radial stress between the spring and the friction part. Conversely, action from the outlet part on the opposite side of the first tab causes the spring to move in rotation in the second direction, i.e. in the opposite direction. This movement blocks the outlet part, i.e. it tends to increase the diameter of the outside envelope of the spring. The friction between the bore in the friction part and the turns of the spring therefore increases. The same applies for the radial stress between the spring and the friction part. In addition, the inlet part can also act on the second tab of the spring in order to drive the spring in rotation in the second direction, while also releasing the outlet part. Furthermore, the outlet part can also act on the second tab of the spring in order to drive the spring in rotation in the first direction. In which case, the outlet part is blocked, or at least is braked by means of the spring rubbing against the friction part. Therefore, the inlet part moving in rotation makes it possible for the spring and for the outlet part to be moved in rotation, while the outlet part moving in rotation blocks the movement begun by the outlet part.

The main braking of the outlet part is thus obtained by the spring rubbing against the friction part. A second phenomenon contributes to the braking of the outlet part, namely the outlet part rubbing at its guide means. This rubbing is directly related to the torque applied to the brake. When drive torque is exerted on the inlet part, the inlet part applies a force on the outlet part via a tab of the spring. Since that force is asymmetrical about the axis of the outlet part, it induces a radial force that causes the outlet part to be moved until it bears against its guide means. That contact brakes the outlet part. When torque is exerted on the outlet part, said outlet part applies a force on a tab of the spring that tends to hold the spring stationary in rotation. In reaction to that asymmetrical force, a radial force causes the outlet part to be moved until it bears against its guide means. Thus, in conventional spring brake designs, secondary braking torque exists that is added to the main braking torque of the spring against the friction part. That secondary braking torque is then applied both while the screen is being raised and also while it is being lowered.

In Patent EP-B-0 976 909, a spring brake comprises an inlet part having two teeth, an outlet part also having two teeth, a spring, and a friction part. The drive torque exerted on the inlet part is transmitted to the outlet part via a tooth bearing against one of the tabs of the spring, which tab bears against a tooth of the outlet part. Since the force exerted on the outlet part is asymmetrical, it results in a radial force being applied to said outlet part and thus in secondary braking torque being applied. When torque is applied to the outlet part, a phenomenon occurs that is similar to the phenomenon that occurs in the brake of FR-B-2 610 668. A tooth of the outlet part bears against a tab of the spring that blocks the spring. In reaction to that asymmetrical force, a radial force causes the outlet part to be moved until it bears against its guide means.

The way in which conventional spring brake designs as described in the preceding examples operate suffers from drawbacks in certain configurations. When the actuator drives a screen in the lowering direction, i.e. when the load torque exerted by the weight of the screen at the outlet part is in the same direction as drive torque from the actuator that is exerted at the inlet part, it is advantageous for secondary braking torque to be added to the main braking torque because that reduces the response time of the brake, thereby making the installation safer. Unfortunately, the existence of secondary braking torque while the screen is being raised, i.e. when the load torque exerted by the weight of the screen at the outlet part is opposed to drive torque from the actuator that is exerted at the inlet part, is particularly disadvantageous because the brake brakes continuously, thereby requiring the motor to be over-dimensioned. The motor must not only raise the load, i.e. exert torque that is greater than the load torque, but must also compensate for the secondary braking torque, since said secondary braking torque is added to the load torque.

SUMMARY OF THE INVENTION

The invention proposes an electric actuator provided with a spring brake that improves the operation of the above-described brakes, while also preserving the advantages of those brakes. In order to optimize dimensioning of the motor, the invention aims to eliminate the secondary braking torque while the load is being raised. To this end, the invention provides an electric actuator for driving a home-automation screen mounted to move between an open position and a closed position, said actuator being provided with a spring brake, said brake comprising:

a helical spring, each end of which forms a respective tab extending radially or axially relative to a central axis of the spring;

a friction part having a substantially cylindrical friction surface against which at least one turn of the helical spring bears radially;

an inlet part driven by an electric motor of the actuator, and suitable for coming into contact with at least one tab of the spring, in such a manner as to drive the spring in rotation about a central axis of the brake, in a direction making it possible to reduce the contact force between the helical spring and the friction surface; and an outlet part connected to the screen and suitable for coming into contact with at least one tab of the spring in such a manner as to drive the spring in rotation about the central axis of the brake, in a direction making it possible to increase the contact force between the helical spring and the friction surface.

In this actuator, while the screen is being lowered, the inlet part drives the spring in rotation with the contact force being decreased to the extent that the outlet part is released in rotation, without direct contact between the inlet part and the outlet part. According to the invention, the inlet part has at least two contact surfaces suitable for transmitting drive torque for raising the screen, by direct contact, to at least two corresponding contact surfaces of the outlet part.

The screen generates load torque at the outlet part, which torque makes it possible to generate secondary braking torque. As a result, this actuator is particularly suitable for screens that move vertically and whose weight makes it possible to generate the preceding load torque. This may be for winding an apron around a tube or for swinging a garage door between a horizontal position and a vertical position.

The inlet part and the outlet part are in direct contact only while the screen is being raised. Thus, during lowering, these two parts are not in direct contact for transmitting the drive torque. During lowering, the inlet part releases the brake by acting only on one of the tabs of the spring. The drive torque is exerted on that tab. No force is transmitted between the inlet part and the outlet part. The outlet part is retained by the other tab of the spring. As a result, it exerts a force, generated by the load torque, on that tab only, so as to drive the spring in rotation about the central axis of the brake, in a direction making it possible to increase the contact force between the helical spring and the friction surface.

In the present description "direct contact" between two parts means that one part acts on the other either by direct co-operation of complementary surfaces, or by co-operation between complementary surfaces through another part that is rigid disposed between these surfaces, or else by a combination of the preceding types of co-operation. Direct contact can be obtained by one or more contact surfaces disposed on the outlet part, such a contact surface being a surface against which there comes to bear a complementary contact surface of the inlet part or a complementary surface of an intermediate part urged by the inlet part. In order to implement the invention, it is necessary for the torque to be transmitted via at least two contact surfaces of the outlet part.

The balancing of the drive torque that makes it possible to reduce the secondary braking torque during raising can be achieved astutely by transmitting the drive torque via a plurality of sets of contact surfaces disposed, about the axis of rotation of the spring, in a manner such that the drive torque is transmitted in substantially balanced manner, making the outlet part relatively unstressed radially. These sets of surfaces can be disposed about the axis of the outlet part in a manner such as to reduce or eliminate the induced radial force. For example, the torque can be transmitted via two contact surfaces of the outlet part that are substantially identical and that are diametrically opposite each other about the axis of the outlet part. This solution is simple to implement.

Advantageously, operation of the brake is identical, regardless of the direction of the drive torque for raising the screen. This characteristic makes it possible to obtain a versatile actuator that can be installed independently of the configuration of the screen. For example, for a tubular actuator that fits into a winding tube, operation of the actuator is identical regardless of whether the screen is wound in one direction or in the opposite direction. This symmetrical operation of the brake makes it possible to rationalize a product range and to facilitate installation of the actuator because there is no need to distinguish whether the motor should be mounted in a particular manner relative to the screen.

According to other advantageous but non-essential aspects of the invention:
  in the absence of drive torque, the outlet part exerts a force on the tab of the spring in such a manner as to drive the spring in rotation about the central axis of the brake, in a direction making it possible to increase the contact force between the spring and the friction surface;
  at at least one contact surface, the direct contact between the inlet part and the outlet part is achieved by means of a rigid part such as one of the tabs of the spring;
  the configuration of the contact surfaces makes it possible to balance the transmission of the raising drive torque, in such a manner as to eliminate or significantly reduce the radial component, relative to the axis of rotation of the spring, of the forces transmitted to the outlet part; and
  the two contact surfaces of the outlet part are diametrically opposite each other about the axis of the outlet part.

Provision may be made for the outlet part to be suitable for coming into contact with a part having dynamic behavior different from that of the outlet part, in particular a part secured to or integral with the friction part or the inlet part, when a radial force is exerted on the outlet part, said radial force being generated only while the screen is being lowered.

The outlet part is advantageously suitable for coming to bear against a centering member for centering the outlet part relative to the inlet part under the effect of the radial component of the resultant of the load torque exerted by the screen, while the screen is being lowered.

Provision may be made for the outlet part to be guided in rotation relative to the inlet part. The inlet part and the outlet part must be centered relative to each other. The inlet part and the outlet part may be centered by a shaft passing through said parts. The shaft is mounted in tight-fitting manner in the inlet part or in the outlet part and is mounted to slide in the other part, i.e. respectively in the outlet part or in the inlet part. This centering is simple to achieve and is compact. The sub-assembly formed by the inlet part and by the outlet part is then advantageously centered relative to the friction part. This centering may be achieved either by the outlet part, or by the inlet part. Preferably, the sub-assembly is centered by the inlet part, because that makes it possible to reduce the vibration of the brake considerably.

DESCRIPTION OF THE DRAWINGS

The invention can be better understood on reading the following description given merely by way of example and with reference to the accompanying drawings, in which.

DESCRIPTION OF EMBODIMENTS

Figure 1:
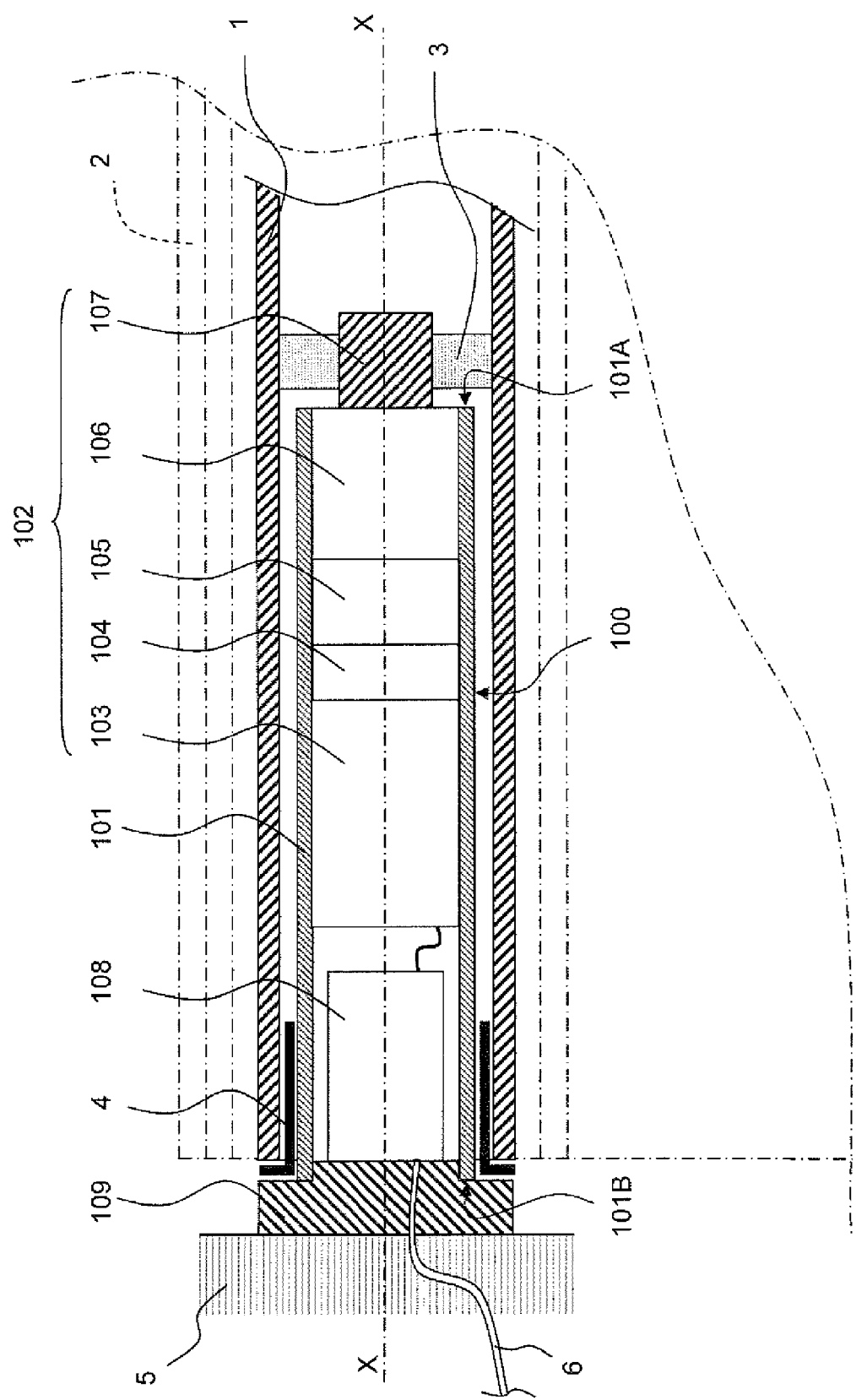
FIG. 1 is a diagrammatic view of the architecture of a tubular actuator of the invention that incorporates a spring brake of the invention.

FIG. 1 diagrammatically shows a rotary tubular actuator 100 designed to drive in rotation a winding tube 1 on which an apron 2 for closing an opening 0 can be wound to various extents. The tube 1 is driven by the actuator 100 in rotation about an axis of revolution X-X that is disposed horizontally at the top of the opening. For example, the opening O is an opening provided in the walls of a building. The actuator 100, the tube 1, and the apron 2 then form a motor-driven roller blind.

The actuator 100 comprises a stationary cylindrical tube 101 in which a motor-and-gearbox unit 102 is mounted that is made up of an electric motor 103, a first gearbox stage 104, a spring brake 105, a second gearbox stage 106, and an outlet shaft 107 that projects at one end 101A of the tube 101, and that drives a wheel-ring 3 that is constrained to rotate with the tube 1.

The winding tube 1 turns about the axis X-X and about the stationary tube 101 by means of two pivot couplings. A bearing-ring 4 mounted on the outside periphery of the tube 101 in the vicinity of its end 101B opposite from the end 101A forms the first pivot coupling. The second pivot coupling is installed at the other end of the tube 1 and is not shown.

The actuator 100 further comprises a fastening part 109 that projects from the end 101E and that makes it possible to fasten the actuator 100 to a frame 5. Said fastening part 109 is, in addition, designed to close off the tube 101 and to support a control module 108 for controlling the power supply to the motor 103. Said control module is powered via a mains power supply cable 6.

While the tubular actuator 100 is operating, the motor-and-gearbox unit 102 drives in rotation the shaft 107 which, in turn, drives in rotation the tube 1 via the wheel-ring 3. For example, when the actuator 100 is installed in a roller blind case, the shaft 103 rotating causes the opening O to be opened and to be closed in alternation. The apron 2 thus moves vertically in the opening O, between an opening high position and a closure low position.

Figure 2:
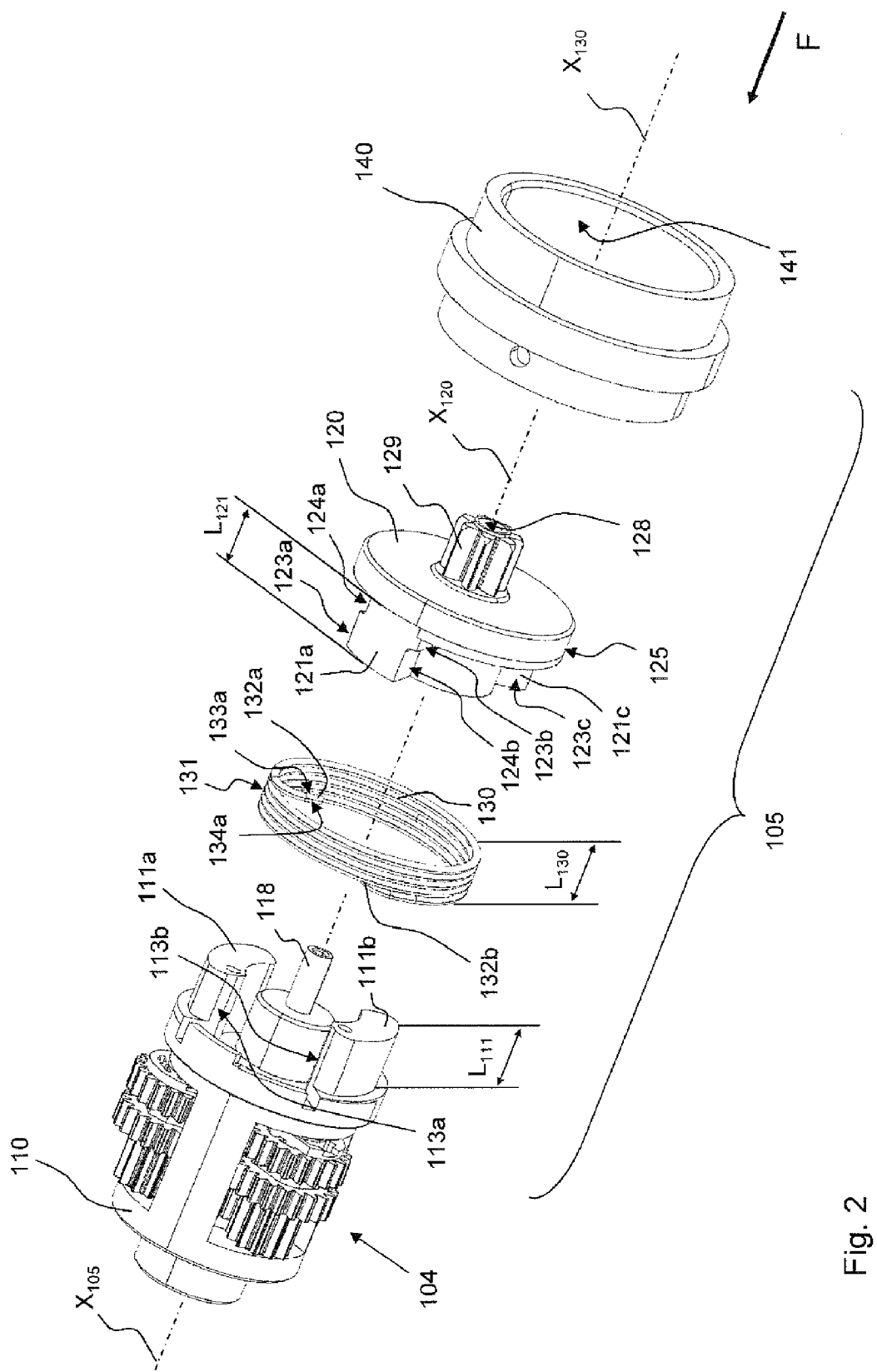
FIG. 2 is an exploded perspective view of a spring brake belonging to the actuator of FIG. 1.
Figure 3:
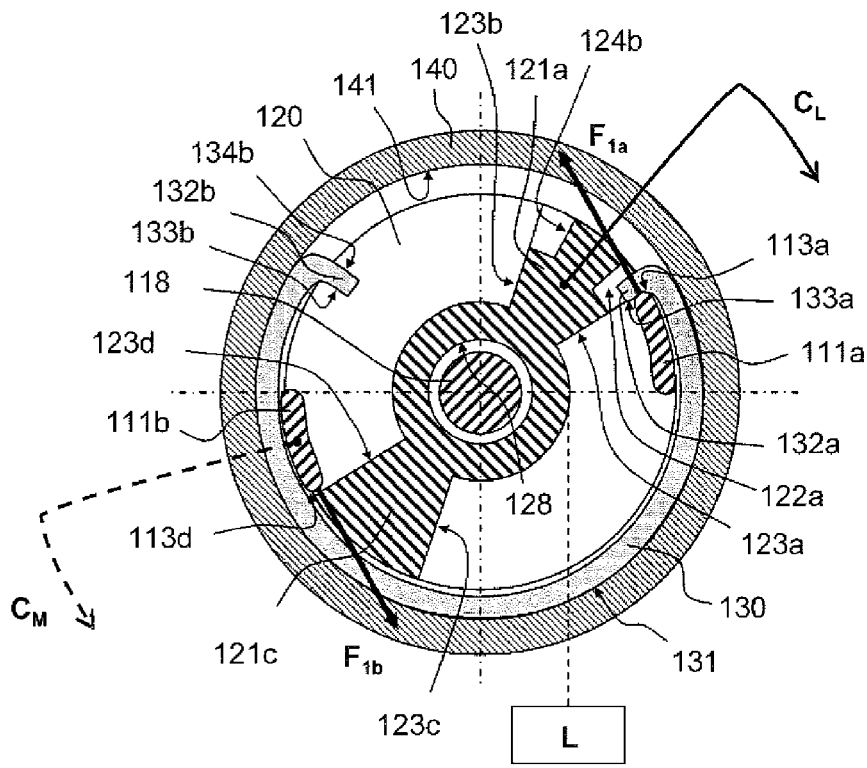
FIG. 3 is a diagrammatic cross-section view of operation of the spring brake 2 of FIG. 2 during raising of a load.
Figure 4:
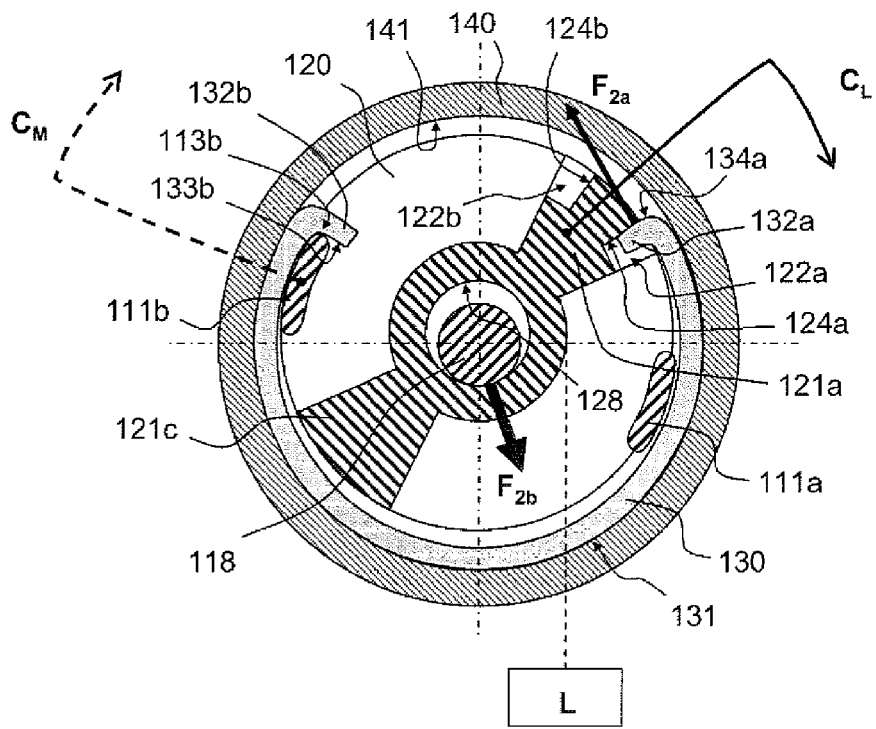
FIG. 4 is a diagrammatic cross-section view of operation of the spring brake 2 during lowering of a load.

FIGS. 2 to 4 more particularly show the structure of the spring brake 105 in a first embodiment of the invention. As shown in FIG. 1, a rotor of the motor 103 drives an epicyclic gear train of the first gearbox stage 104. The cylinder 110 of the epicyclic train that carries three planet gears also forms an inlet part of the brake 105. The brake 105 includes a helical spring 130 having its turns centered on an axis $X_{130}$ that coincides with the axis X-X when the brake 105 is in place, as shown in FIG. 1. Said spring is mounted in tight-fitting manner inside a bore 141 in a friction part 140. In other words, the outside envelope 131 of the spring 130, which envelope is defined by the outside generator lines of its turns, bears against the radial surface of the bore 141, thereby tending to secure together the spring 130 and the part 140 by friction.

Each end of the spring 130 forms a tab 132a, 132b extending radially towards the axis $X_{130}$ and towards the inside of the spring, from its turns.

The inlet part 110 is provided with two protuberances or "teeth" 111a and 111b that fit into the helical spring 130. Each protuberance 111a or 111b has a face 113a or 113b suitable for being in contact respectively with a surface 133a of a first tab 132a forming the first end of the spring or with a surface 133b of the second tab 132b forming the second end of the spring. The surface 133a is disposed in a manner such that action on said surface causes the spring to be moved in rotation about the axis $X_{130}$ in a direction that is opposite from the direction of rotation of the spring if the action is exerted on the surface 133b.

Action by one of the teeth 111a or 111b on a surface 133a or 133b tends to release the brake, i.e. to move one of the tabs 132a or 132b in a manner such that the radial stress between the outside envelope 131 of the helical spring 130 and the friction surface of the bore 141 decreases. This action from one of the teeth 111a or 111b tends to contract the spring 130 radially about the axis X-X, so that its outside envelope moves away from the surface of the bore 141. The part 110 thus makes it possible to act on the spring 130 to reduce the contact force between the spring and the friction surface of the bore 141. The spring can then turn about the axis $X_{130}$ that coincides with the central axis $X_{105}$ of the brake 105, itself coinciding with the axis X-X when the actuator 100 is in the assembled configuration shown in FIG. 1. A direction or a dimension is said to be "axial" when it extends or is measured parallel to the axis $X_{105}$. A direction is said to be radial when it is perpendicular to and intersects the axis $X_{105}$.

An outlet part 120 of the brake 105 is situated in register with the inlet part 110. The outlet part is provided with two lugs 121a, 121c also fitting into the helical spring 130. The lug 121a is provided with two recesses or setbacks 122a, 122b disposed on either side of said lug. Each recess 122a or 122b is designed to receive a respective one of the tabs 132a, 132b of the spring and is defined partially by a surface 124a, 124b suitable for being in contact with a surface 134a, 134b of a tab 132a, 132b. The surfaces 134a and 134b are opposite from respective ones of the surfaces 133a and 133b.

Action on one of the surfaces 134a, 134b tends to move the tabs 132a and 132b apart, thereby causing the turns of the spring 130 to expand radially relative to the axis $X_{130}$ and increasing the contact force between the spring 130 and the friction surface of the bore 141. This results in actuating the brake, i.e. in blocking or in strongly braking the rotation of the spring 130 relative to the part 140. Thus, the radial stress between the outside envelope 131 of the helical spring and the friction surface 141 increases, thereby holding the part 120 stationary or braking it strongly about the axes $X_{105}$ and $X_{130}$.

In order to enable the brake to operate, it is necessary to have angular clearance between the teeth 111a and 111b of the inlet part 110 and the tabs 132a and 132b of the spring. Similarly, angular clearance is also necessary between the lug 121a and the tabs 132a and 132b of the spring. The width of the lug 121a is designed for this purpose. In addition, the axial length $L_{111}$ or $L_{121}$ of the portions 111a, 111b, and 121a is slightly greater than the axial length $L_{130}$ of the spring.

The outlet part 120 is also provided with a set of teeth 129 forming the interface with the second gearbox stage 106.

The necessary centering of the outlet part 120 relative to the inlet part 110 is achieved by a shaft 118 projecting axially relative to the inlet part, on the same side as the outlet part

120. Said shaft 118 serves as guide means for guiding the outlet part, by means of a bore 128 provided through the center of said outlet part.

As appears more particularly from FIGS. 3 to 4, the load L constituted by the apron 2 can be considered as being secured to the outlet part 120, via the elements 1, 3, 106, and 107, as indicated by the vertical dashed line in FIGS. 3 and 4.

The weight of the load L exerts torque $C_L$ on the outlet part 120 that tends to cause it to turn about the axis $X_{105}$, in the clockwise direction in FIGS. 3 and 4.

Reference $X_{120}$ designates the central axis of the outlet part 120, which axis coincides with the axis $X_{105}$ when the brake is in the assembled configuration.

While the load L is being raised, and as shown diagrammatically in FIG. 3, rotation of the outlet part 120 in the clockwise direction in FIG. 3, which rotation is normally induced by the torque $C_L$, is blocked by the inlet part 110. The inlet part 110 is driven in rotation in the counterclockwise direction in FIG. 3 by torque $C_M$ generated by the motor and weighted by the efficiency of the first gearbox stage 104. The two protuberances 111a and 111b of the inlet part 110 pivot about the coinciding axes $X_{105}$ and X-X until one of the protuberances 111a or 111b is in contact with a face 123a or 123b of the lug 121a of the outlet part. Whereupon, the other protuberance 111b or 111a also enters into contact with one of the faces 123c or 123d of the second lug 121c of the outlet part. Therefore, the drive torque $C_M$ is transmitted to the outlet part via two sets of contact surfaces, formed between the faces 113a and 113d and the faces 123a and 123d that are diametrically opposite each other about the axis $X_{105}$ and about the axis $X_{120}$ of the outlet part, thereby causing the radial component of the resultant of the torque $C_M$ exerted on the outlet part 120 to be reduced or eliminated. The drive torque $C_M$ is of opposite direction to the load torque $C_L$. The faces 123a and 123d constitute the contact surfaces of the outlet part 120.

The balance of the forces to which the outlet part 120 is subjected is shown in FIG. 3. The load torque $C_L$ is balanced by forces $F_{1a}$ and $F_{1b}$ resulting respectively from the surface 113a of the tooth 111a and the surface 123a of the lug 121a bearing against each other, and from the surface 113d of the tooth 111b and the surface 123d of the lug 121c bearing against each other. These two forces $F_{1a}$ and $F_{1b}$ express in terms of forces the drive torque $C_M$ necessary for overcoming the load torque $C_L$. Since the two forces $F_{1a}$ and $F_{1b}$ are of substantially the same magnitude and are substantially symmetrical about the central axis $X_{120}$ of the outlet part, the radial component of the resultant of the torque $C_M$ of the outlet part 120 is negligible, or even zero. It should be noted that the shaft 118 of the inlet part making it possible to center the outlet part is not in contact with the bore 128 of the outlet part in this configuration, due to the fact that the radial component of the above-mentioned resultant is negligible.

In order to raise the load, the torque $C_M$ must be greater than the sum of the load torque $C_L$ and of the drag torque of the brake spring due to the residual friction between the outside envelope 131 of the spring and the friction surface of the bore 141. At start-up, the torque $C_M$ to be exerted must be larger because, in order to release the brake 105, it is necessary to overcome a static friction force. Thus, the protuberance 111a acts on one of the tabs of the spring, which tab is, in this example, the tab 132a, received in the recess 122a, as soon as the lug 121a is driven in rotation.

While the load L is being lowered, and as shown diagrammatically in FIG. 4, the outlet part rotating in the clockwise direction in FIG. 4 is not stopped by the inlet part but by the spring 130. Thus, the load torque $C_L$ presses the lug 121a against one of the tabs 132a or 132b, namely the tab 132a in this example. The effect of this is to expand the turns of the spring 130 radially and to activate the brake 105, as explained above. The torque $C_L$ exerted by the lug 121a on the surface 134a of the tab 132a is weighted by the efficiency of the second gearbox stage 106. The tab 132a is engaged in the recess 122a. The drive torque $C_M$ is in the same direction as the load torque $C_L$.

The balance of the forces of the outlet part is shown in FIG. 4. The load torque $C_L$ is balanced by two forces $F_{2a}$ and $F_{2b}$. The first force $F_{2a}$ corresponds to the reaction of the face 134a of the tab 132a of the spring 130 against the bearing face 124a of the recess 122a. Since said first force $F_{2a}$ does not make it possible to compensate for the load torque $C_L$ fully, the outlet part 120 tends to move perpendicularly to the axis $X_{105}$, relative to the preceding bearing configuration, until the outlet part comes into contact with its guide means formed by the shaft 118 that is secured to or integral with the inlet part 110. The bore 128 for guiding the outlet part thus comes into contact with the shaft 118, then generating the second radial force $F_{2b}$ making it possible to balance the load torque $C_L$. Said second force $F_{2b}$ generates friction during the downward movement of the load. This friction brakes the load and is added to the braking torque of the spring. It thus contributes to the reactivity of the brake. The response time of the brake is faster than the response time of a brake for which said friction does not exist.

It should be noted that, for this embodiment, the inlet part 110 is itself centered relative to the friction part 140 by means of a cylindrical web whose envelope surface (not shown) co-operates with the bore 141 in the friction part. Therefore, the preceding force $F_{2b}$ induces an equivalent force (not shown) between the inlet part 110 and the friction part 140. Said equivalent force participates in the secondary braking torque and contributes to the reactivity of the brake.

In order to make it possible to lower the load, it is necessary to release the brake. For this purpose, the drive torque $C_M$ drives the protuberances 111a and 111b of the inlet part 110 in rotation, the protuberance 111b being driven by said drive torque until it comes into abutment against the face 133b of the tab 132b of the spring 130. By this action, the spring 130 is relaxed and the outlet part 120 can turn, by means of the load torque $C_L$. The parts 110 and 120 are then not in direct contact.

If the direction of winding of the load is reversed, operation is identical. Operation of the brake is thus symmetrical, which makes it easier for it to be installed because the performance of the brake is the same, regardless of the raising direction of the actuator, i.e. regardless of the direction of the drive torque $C_M$ that serves to raise the screen 2.

Figure 5:
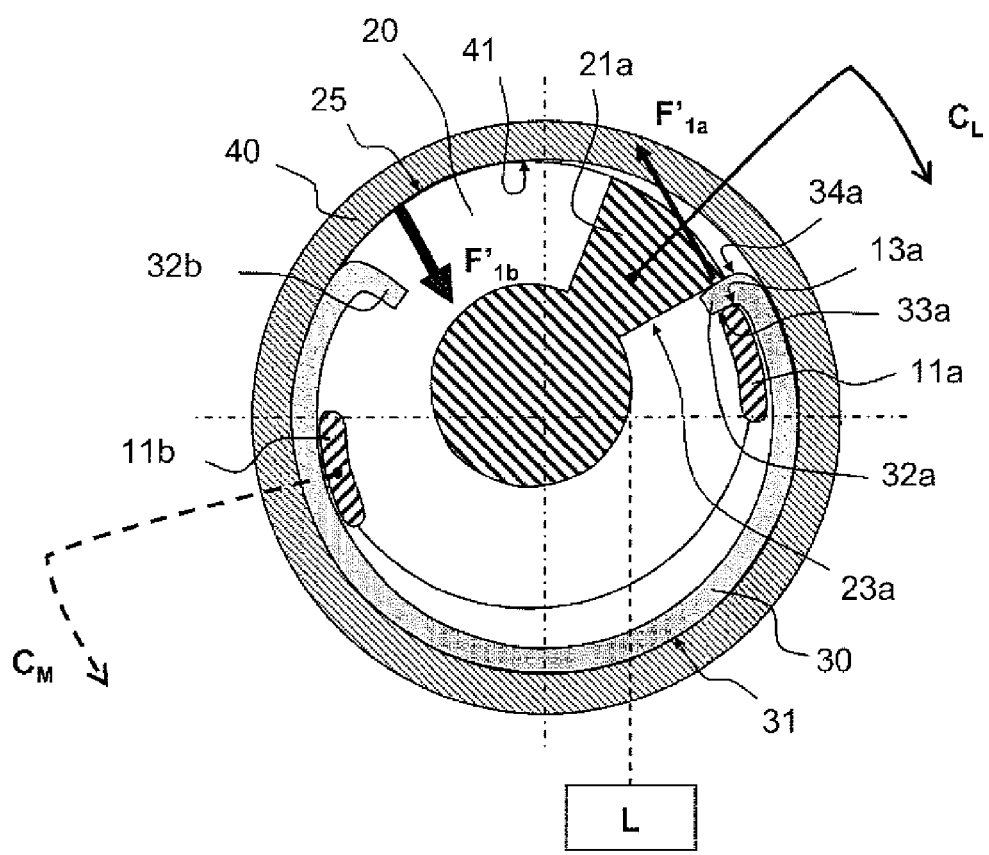
FIG. 5 is a diagrammatic cross-section view of operation of a prior art spring brake during raising of a load.
Figure 6:
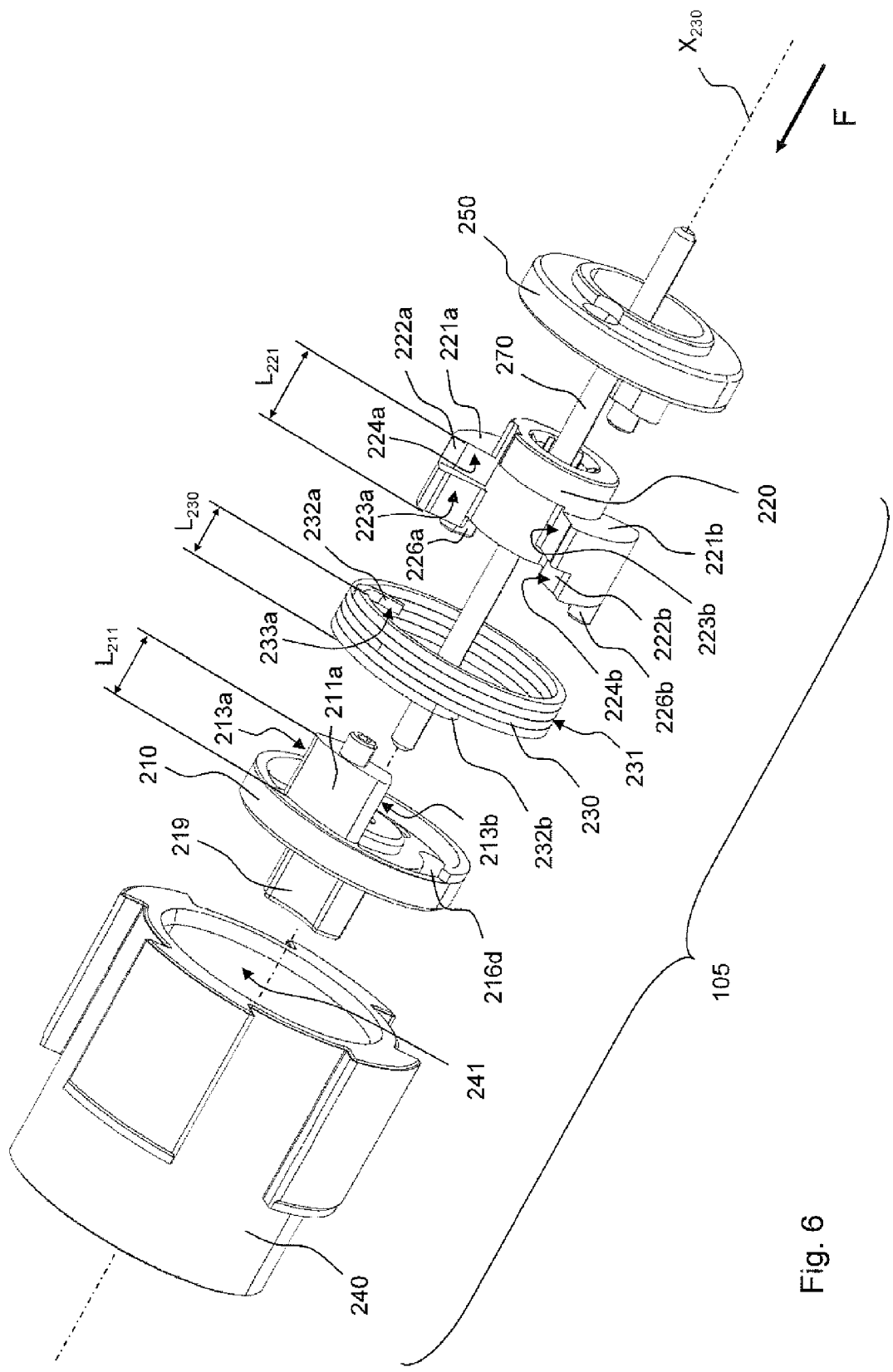
FIG. 6 is an exploded perspective view of a second embodiment of a spring brake that can be part of the actuator of FIG. 1.
Figure 7:
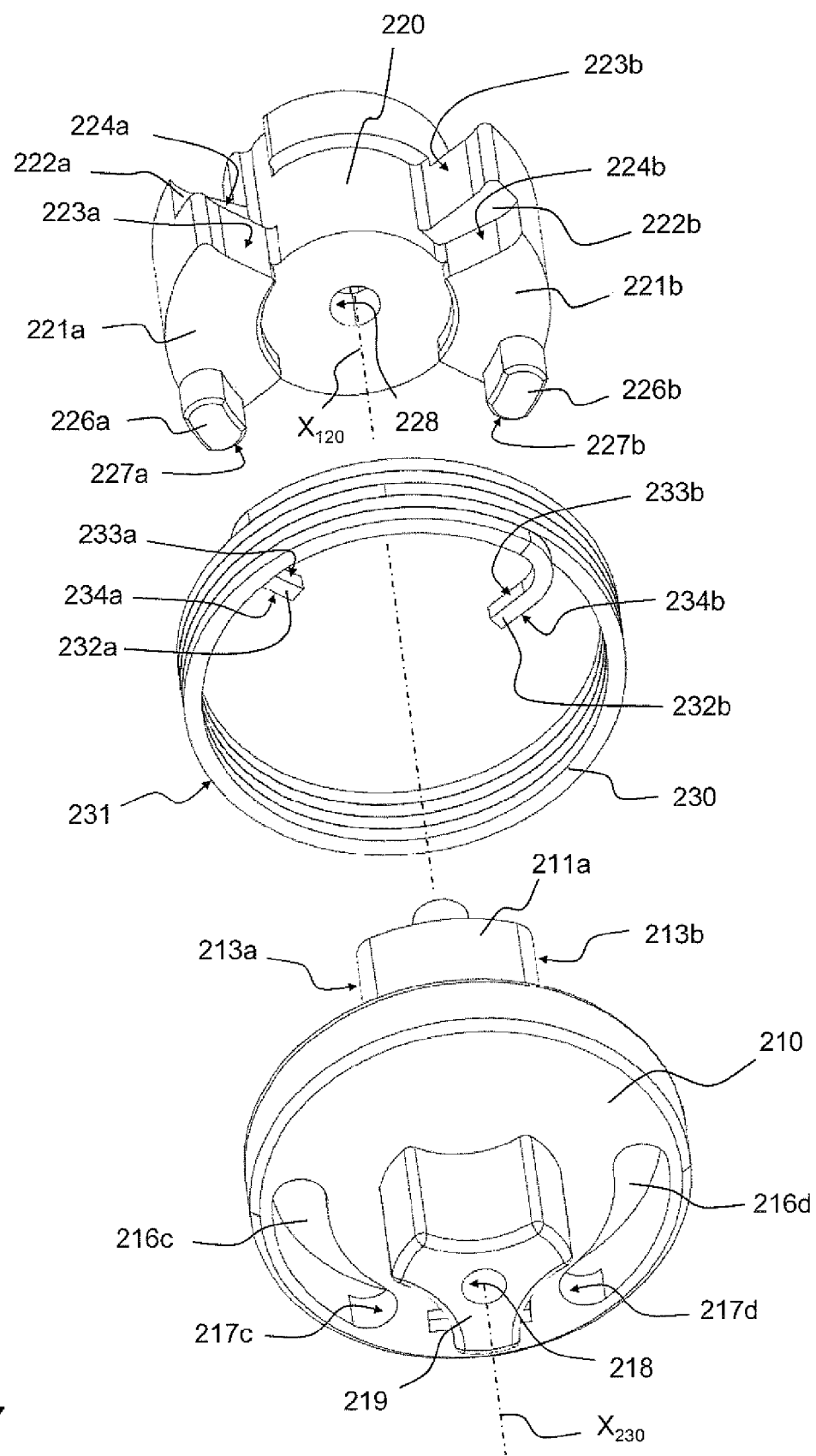
FIG. 7 is an exploded perspective view from a different angle of certain component elements of the spring brake of FIG. 6.

FIG. 5 shows a conventional prior art spring brake, and more particularly how it behaves during raising. The portions of the brake that are shown in FIG. 5 and that are analogous to the portions of the brake 105 bear like references minus 100. For that type of brake, the outlet part is not designed to balance the load torque during raising. The outlet part 20 is provided with one lug 21a only. During raising, operation is similar to operation of the brake 105 in the configuration shown in FIG. 3. The drive torque $C_M$ drives a protuberance 11a in rotation until said protuberance comes into contact with one face 33a of a tab 32a of the spring 30. The opposite face 34a of the tab is in abutment against a face 23a of the lug 21a of the outlet part 20 by means of the load torque $C_L$.

Therefore, the drive torque $C_M$ is transmitted to the outlet part 20 via the tab 32a of the spring 30.

In the embodiment of the invention that is described above with reference to FIGS. 1 to 4, the drive torque is transmitted directly to the outlet part 120 by contact between one face 113a of the inlet part 110 and one face 123a of the outlet part 120, the spring tab then being retracted into the recess 122a provided for this purpose. This makes it possible to achieve better torque transmission and to stress the parts less.

In the brake shown in FIG. 5, the load torque CL is not sufficiently taken up by a tab 32a of the spring to balance said torque, and therefore induces a radial force on the outlet part 20. That radial force causes the outlet part to move until it is in contact with its guide means that are formed by the bore 41 in the friction part 40. The outlet part 20 has a cylindrical web whose envelope surface 25 makes it possible to perform the guiding in the bore 41. Thus, the load torque is balanced firstly by a force $F'_{1a}$ corresponding to the lug 21a bearing against the tab 32a of the spring 30 and secondly by a force $F'_{1b}$, resulting from the outlet part 20 bearing against the bore 41 in the friction part 40. Given that, during raising, the outlet part 20 has a relative speed relative to the friction part 40, said force $F'_{1b}$ generates friction during the load-raising movement. In order to lift the load L, the drive torque $C_M$ must therefore be greater than the sum of the load torque $C_L$, of said friction, and, on start-up, of the torque necessary to release the brake. Therefore, said friction adversely affects the dimensioning of the motor because said motor must be more powerful in order to compensate for the additional friction resulting from the force $F'_{1b}$.

For lowering the load, operation is analogous to the operation shown in FIG. 3 for the brake of the invention. Balancing of the forces is, however, more similar to the balancing shown in FIG. 5. The load is braked by the braking torque of the spring 30 and by the friction with the guide means formed by the bore 41 in the outlet part.

FIGS. 4 and 5 show two different guide means for guiding the outlet part 20 or 120. In FIG. 4, the outlet part 120 is guided relative to the inlet part 110. The inlet part 110 is also centered relative to the friction part 140. In FIG. 5, the outlet part 20 is guided relative to the friction part 40 that is stationary. Tests have shown that the brake 105 behaves better in the FIG. 4 situation. The centering of the outlet part relative to the inlet part makes it possible to reduce the vibration of the brake.

FIGS. 6 to 11 show a second embodiment of the brake. The operating principle is close to the first embodiment. The references of these parts are analogous to the references of the first embodiment, plus 100.

The outlet of the epicyclic gear train of the first gearbox stage 104 drives in rotation a part 210 forming the inlet of the brake 105. The inlet part 210 is provided with a polygonal shaft 219 designed to receive and to transmit torque coming from the gearbox stage 104. The brake 105 includes a helical spring 230 whose turns are centered on an axis $X_{230}$ that coincides with the axis X-X when the brake 105 is in place as shown in FIG. 1. The axes $X_{230}$ and X-X coincide with the central axis $X_{105}$ of the brake 105 when an actuator 100 incorporating the brake 105 of this second embodiment is in the assembled configuration.

The spring 230 is mounted in tight-fitting manner inside a bore 241 in a friction part 240. In other words, the outside envelope 231 of the spring 230, which envelope is defined by the outside generator lines of its turns, bears against the radial surface of the bore 241, thereby tending to secure together the spring 230 and the part 240 by friction.

Each end of the spring 230 forms a tab 232a, 232b extending radially towards the axis $X_{230}$ and towards the inside the spring, from its turns.

The inlet part 210 is provided with a protuberance or "tooth" 211a that fits into the helical spring 230, between the tabs 232a and 232b. Said tooth 211a has two faces 213a, 213b suitable for being in contact respectively with a surface 233a of a first tab 232a forming the first end of the spring and with a surface 233b of the second tab 232b forming the second end of the spring. The surface 233a is disposed in a manner such that action on said surface causes the spring to be moved in rotation about the axis $X_{230}$ in a direction that is opposite from the direction of rotation of the spring if the action is exerted on the surface 233b.

Action by the tooth 211a on a surface 233a or 233b tends to release the brake, i.e. to drive the tab 232a or 232b in rotation about the axes $X_{230}$ and $X_{105}$, in a direction such that the radial stress between the outside envelope 231 of the spring 230 and the friction surface of the bore 241 decreases. Action from the tooth 211a on one of the faces 233a or 233b tends to contract the spring 230 radially about the axis X-X, so that its outside envelope moves away from the surface of the bore 241. The part 210 thus makes it possible to act on the spring 230 to reduce the contact force between the spring and the friction surface of the bore 241.

An outlet part 220 of the brake 105 is situated in register with the inlet part 210. The outlet part is provided with two lugs 221a, 221b also fitting into the helical spring 230. Each lug is provided with a recess or a setback 222a, 222b designed to receive a respective one of the tabs 232a, 232b of the spring 230. Each recess 222a, 222b is defined partially by a surface 224a, 224b suitable for being in contact with a surface 234a, 234b of a tab 232a, 232b. The surfaces 234a and 234b are opposite from respective ones of the surfaces 233a and 233b.

Action on one of the surfaces 234a, 234b tends to move the tabs 232a and 232b towards each other, thereby causing the turns of the spring 230 to expand radially relative to the axis $X_{230}$ and increasing the contact force between the outside envelope 231 of the spring 230 and the friction surface of the bore 241. This results in actuating the brake, i.e. in blocking or in strongly braking the rotation of the spring 230 relative to the part 240. Thus, the radial stress between the outside envelope 231 of the helical spring and the friction surface 241 increases.

In addition, each lug 221a, 221b of the outlet part 220 is provided with a projecting portion 226a, 226b extending axially towards the inlet part and suitable for being received in respective ones of banana-shaped slots 216c, 216d in the inlet part 210, once the brake 105 is assembled. Said projecting portions 226a and 226b are dimensioned and disposed in a manner such that their faces 227a, 227b are in contact with respective ones of inside faces 217c, 217d defining the corresponding slots 216c, 216d when the face 213b, 213a of the tooth 211a of the inlet part 210 is in contact with the face 223b, 223a of a lug 221b, 221a of the outlet part 220.

Figure 8:
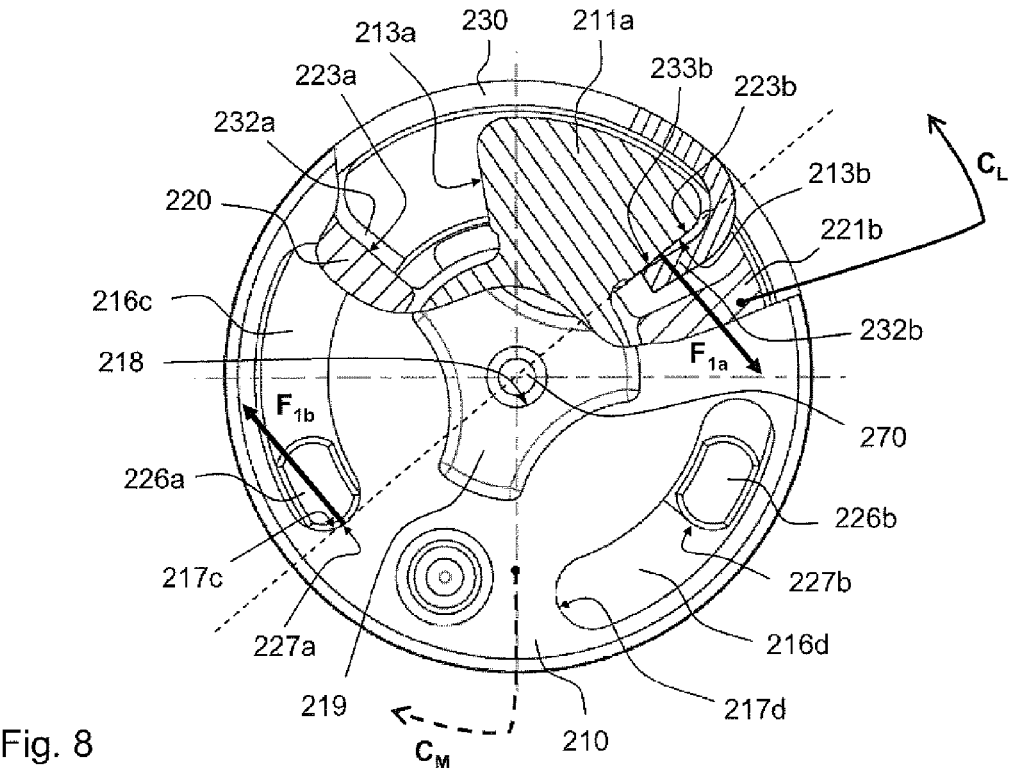
FIG. 8 is a diagrammatic end view seen looking along arrow F in FIG. 6, and partially in cross-section, showing operation of the spring brake of FIG. 6 during raising of a load that generates torque in the clockwise direction on the outlet part of the brake.
Figure 10:
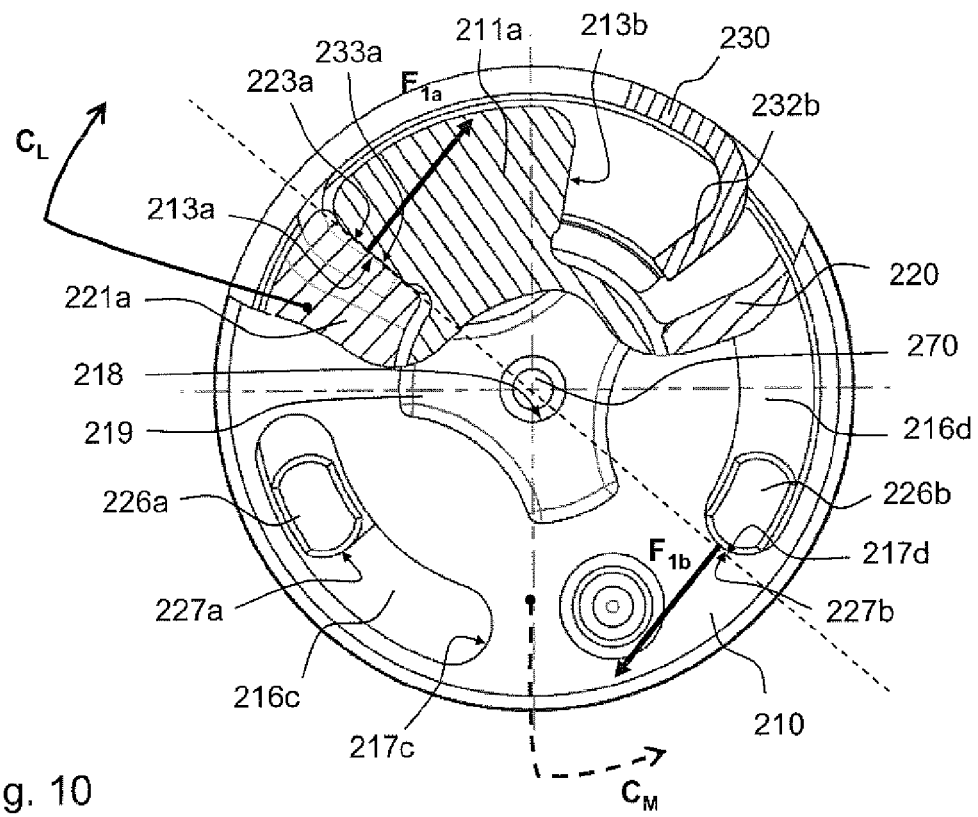
FIG. 10 is a diagrammatic end view partially in cross-section analogous to FIG. 8, showing operation of the spring brake of FIG. 6 during raising of a load that generates torque in the counterclockwise direction on the outlet part of the brake.

FIGS. 8 and 10 show the two possible configurations for the brake 105. The dimensioning of the slots 216c, 216d is such that, outside the two preceding configurations, the projecting portions 226a, 226b do not come into abutment against any inside surface of the slot.

In order to enable the brake to operate, it is necessary to have angular clearance between the tooth 211a of the inlet part 210 and the tabs 232a and 232b of the spring. Similarly, angular clearance is also necessary between the lugs 221a and 221b and the tabs 232a and 232b of the spring. The width of the tooth 211a is designed for this purpose. In addition, the axial length $L_{211}$ or $L_{221}$ of the portions 211a, 221a, and 221b is slightly greater than the axial length $L_{230}$ of the spring.

The necessary centering of the outlet part 220 relative to the inlet part 210 is achieved by a shaft 270. Said shaft is engaged in a centered bore 218 of the inlet part 210. A portion of the shaft 270 projects from the same side as the outlet part 220.

Figure 9:
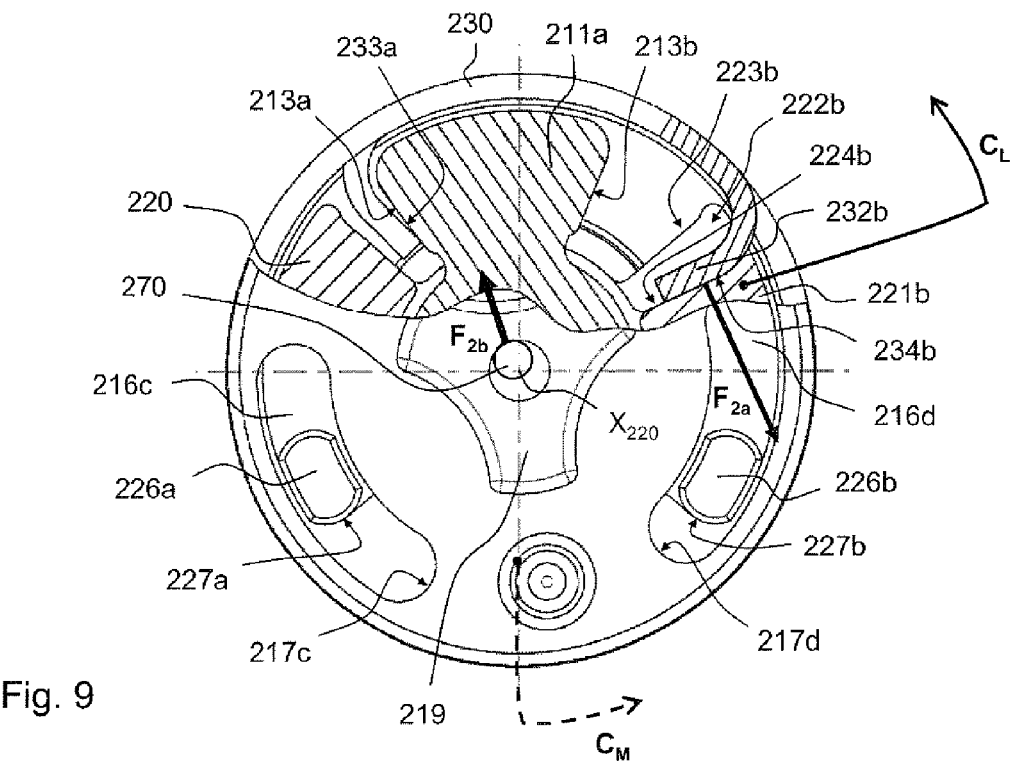
FIG. 9 is a diagrammatic end view partially in cross-section analogous to FIG. 8, showing operation of the spring brake of FIG. 6 during lowering of a load that generates torque in the clockwise direction on the outlet part of the brake.
Figure 11:
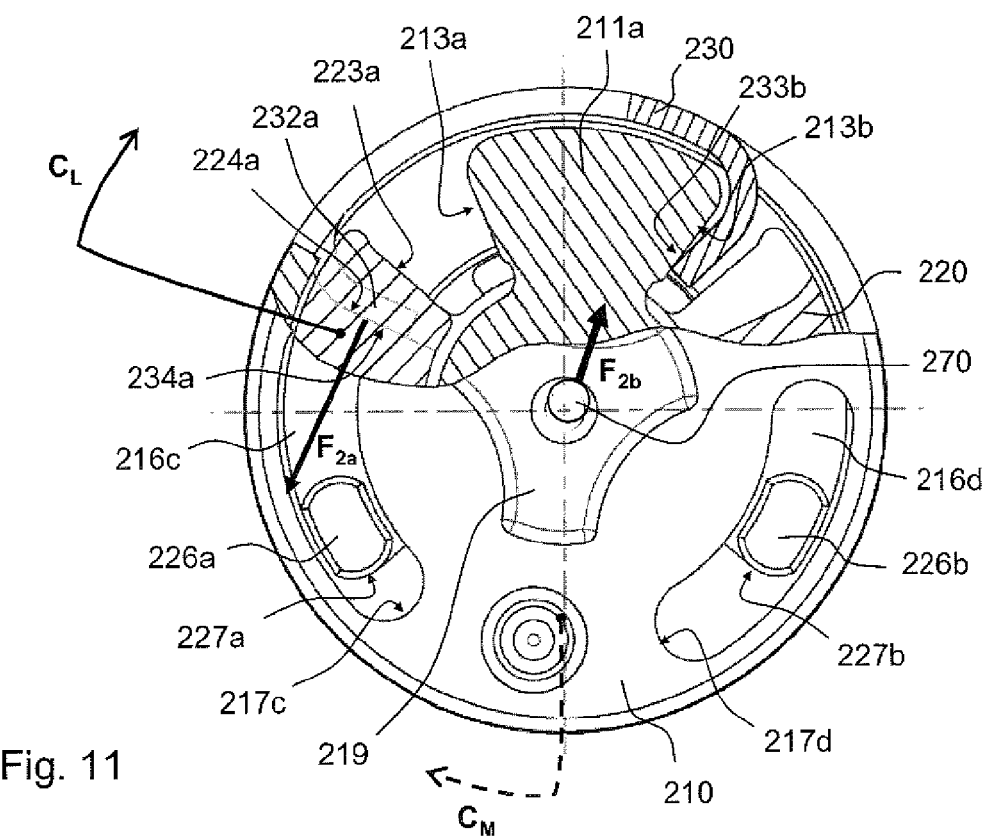
FIG. 11 is a diagrammatic end view partially in cross-section analogous to FIG. 8, showing operation of the spring brake of FIG. 6 during lowering of a load that generates torque in the counterclockwise direction on the outlet part of the brake.

FIGS. 8 to 11 show how the brake 105 operates. FIGS. 8 and 9 correspond to the screen being wound on the shaft 1 in the clockwise direction in said figures. FIG. 8 shows the load being raised, while FIG. 9 shows the load being lowered. FIGS. 10 and 11 correspond to the screen being wound on the shaft 1 in the counterclockwise direction in these figures. FIG. 10 shows the load being raised while FIG. 11 shows it being lowered.

Firstly, operation of the brake is explained relative to the first screen-winding configuration, i.e. to winding in the clockwise direction in FIGS. 8 and 9.

By default, the weight of the load L exerts torque $C_L$ on the part 220 that presses one of the lugs 221a or 221b, namely the lug 221b in this example, against one of the tabs 232a or 232b, namely the tab 232b in this example, as shown in FIG. 9. The effect of this is to expand the turns of the spring 230 radially and to activate the brake 105, as explained above. The torque $C_L$ exerted by the lug 221b on the surface 234b of the tab 232b is weighted by the efficiency of the second gearbox stage 106. This torque is shown by a vector associated with the lug 221b. The tab 232b is then engaged in the recess 224b.

While the load L is being raised, and as shown in FIG. 8, the inlet part 210 is driven in rotation by torque $C_M$ generated by the motor and weighted by the efficiency of the first gearbox stage 104. The protuberance 211a of the inlet part then turns until it is in contact with the lug 221b of the outlet part, at the interface between the surfaces 213b and 223b. In order to raise the load, the torque $C_M$ must then be greater than the sum of the torque $C_L$ and of drag torque of the brake spring due to the residual friction between the outside envelope of the spring and the friction surface of the bore 241. The torque $C_M$ is represented by a vector in dashed lines associated with the inlet part.

At start-up, the torque $C_M$ to be exerted must be larger because, in order to release the brake 105, it is necessary to overcome a static friction force. In order to release the brake 105, the protuberance 211a acts on the tab 232b received in the recess 222b whenever the lug 221b is driven in rotation. The drive torque $C_M$ is transmitted from the inlet part 210 to the outlet part 220 by double contact. On one side, the face 213b of the protuberance 211a bears against the face 223b of the lug 221b. And, diametrically opposite, the inside face 217c of the slot 216c bears against the face 227a of the projecting portion 226a. Thus, the load torque $C_L$ is balanced by efforts $F_{1a}$ and $F_{1b}$ resulting from the bearing between the portions 211a and 221b, on one side, and 216c and 226a, on the other side. Since these two forces are of substantially the same magnitude and are substantially symmetrical about the central axis $X_{105}$ of the brake 105 and about the axis $X_{220}$ of the outlet part, the radial component of the resultant of the torque $C_M$ on the outlet part is negligible, or indeed zero. The faces 223b and 227a constitute contact surfaces of the outlet part.

While the load L is being lowered, as shown diagrammatically in FIG. 9, the outlet part 220 is not stopped by the inlet part 210 but rather it is stopped by the spring 230. Thus, the load torque $C_L$ presses the lug 221b against one of the tabs 232a or 232b, namely the tab 232b in this example. The effect of this is to cause the turns of the spring 230 to expand radially and to activate the brake 105, as explained above.

The torque $C_L$ exerted by the lug 221b on the surface 234b of the tab 232b is weighted by the efficiency of the second gearbox stage 106. The tab 232b is engaged in the recess 222b. The drive torque $C_M$ is in the same direction as the load torque $C_L$. The balance of the forces is then different from the balance during raising. The load torque $C_L$ is balanced by forces $F_{2a}$ and $F_{2b}$. The first force $F_{2a}$ corresponds to the reaction of the spring that blocks the load at the interface between the face 234b of the tab 232b of the spring 230 and the bearing face 224b of the recess 222b of the lug 221b of the outlet part. Since the first force $F_{2a}$ does not make it possible to compensate for the load torque $C_L$, the outlet part 220 tends to pivot relative to the preceding bearing configuration until the outlet part is in contact with its guide means formed by the shaft 270 that is secured to or integral with the inlet part 210. The bore 228 for guiding the outlet part 220 relative to the shaft 270 thus comes into contact with the shaft 270, thereby generating the second force $F_{2b}$ making it possible to balance the load torque $C_L$. This force is radial relative to the axis $X_{220}$. This force $F_{2b}$ generates friction while the load L is moving downwards. This friction brakes the load and is added to the braking torque of the spring. It therefore contributes to the reactivity of the brake. Its response time is faster than the response time of a brake for which such friction does not exist.

It should be noted that, for this embodiment, the inlet part 210 is itself centered relative to the friction part 240 by means of a cylindrical web whose envelope surface (not shown) co-operates with the bore 241 of the friction part. Therefore, the preceding force $F_{2b}$ then induces an equivalent force (not shown) between the inlet part 210 and the friction part 240. This equivalent force participates in the secondary braking torque contributing to the reactivity of the brake.

In order to enable the load to be lowered, it is necessary to release the brake. For this purpose, the drive torque $C_M$ drives a protuberance 211a on the inlet part in rotation until it comes to bear against the face 233a of the tab 232a of the spring 230. By this action, the spring 230 is relaxed and the outlet part 220 can turn, by means of the load torque $C_L$, since the parts 210 and 220 are then not in direct contact.

Operation of the brake in the second winding configuration is shown in FIGS. 10 and 11.

During raising, and as shown in FIG. 10, the load torque $C_L$ is balanced by the forces $F_{1a}$ and $F_{1b}$ resulting firstly from the contact between the face 213a of the tooth 211a and the face 223a of the lug 221a, and secondly from the contact between the inside face 217d of the slot 216d, and the face 227b of the projecting portion 226b. Since these forces $F_{1a}$ and $F_{2a}$ are balanced, the radial component of the resultant of the torque $C_M$ on the outlet part 220 is negligible. The motor must thus deliver drive torque that is greater than the load torque $C_L$ to which only the drag torque of the brake is added, which drag torque results from the friction between the spring 230 and the friction part 240. There is little or no secondary braking torque generated by the friction between the outlet part 220 and its guide shaft 270. The faces 223a and 227b constitute the contact surfaces of the outlet part.

During lowering, the load torque $C_L$ is balanced by the forces $F_{2a}$ and $F_{2b}$. The first force $F_{2a}$ corresponds to the reaction of the spring 230 blocking the load L at the interface between the face 234a of the tab 232a of the spring 230 and the bearing face 224a of the recess 222a in the lug 221a. The second force $F_{2b}$ corresponds to a localized force at the guide shaft 270 of the outlet part 220, while the parts 210 and 220 are not in direct contact. This friction generates a radial force braking the load. Thus, the brake reacts rapidly because the secondary braking torque no longer becomes negligible.

The two embodiments describe a brake spring whose ends are folded over towards the inside of the spring. Naturally, said ends can be folded over towards the outside of said spring. Another variant consists in folding over the ends parallel to the central axis of the spring. The tabs then extend axially on either side of the spring, while extending away from the center of the spring.

In addition, the spring brake does not specifically have to be received between two gearbox stages. It can be disposed at the outlet of the motor or at the outlet of the gearbox.

The invention claimed is:

1. An electric actuator for driving a home-automation screen mounted to move between an open position and a closed position, said actuator being provided with a spring brake, said brake comprising:
   a helical spring, each end of which forms a respective tab extending radially or axially relative to a central axis of the spring;
   a friction part having a substantially cylindrical friction surface against which at least one turn of the helical spring bears radially;
   an inlet part driven by an electric motor of the actuator, and suitable for coming into contact with at least one tab of the spring, in such a manner as to drive the spring in rotation about a central axis of the brake, in a direction making it possible to reduce the contact force between the helical spring and the friction surface; and
   an outlet part connected to the screen and suitable for coming into contact with at least one tab of the spring in such a manner as to drive the spring in rotation about the central axis of the brake, in a direction making it possible to increase the contact force between the helical spring and the friction surface;
   in which actuator, while the screen is being lowered, the inlet part drives the spring in rotation with the contact force being decreased to the extent that the outlet part is released in rotation, without direct contact between the inlet part and the outlet part;
   wherein the inlet part has at least two contact surfaces adapted to transmit a drive torque for raising the screen, by direct contact, to at least two corresponding contact surfaces of the outlet part.

2. An actuator according to claim 1, wherein the behavior of the brake is identical, regardless of the direction of the drive torque for raising the screen.

3. An actuator according to claim 1, wherein, in the absence of drive torque, the outlet part exerts a force on the tab of the spring in such a manner as to drive the spring in rotation about the central axis of the brake, in a direction making it possible to increase the contact force between the spring and the friction surface.

4. An actuator according to claim 1, wherein, at at least one contact surface, the direct contact between the inlet part and the outlet part is achieved by means of a rigid part such as one of the tabs of the spring.

5. An actuator according to claim 1, wherein the configuration of the contact surfaces makes it possible to balance the transmission of the raising drive torque, in such a manner as to eliminate or significantly reduce the radial component, relative to the axis of rotation of the spring, of the forces transmitted to the outlet part.

6. An actuator according to claim 1, wherein the two contact surfaces of the outlet part are diametrically opposite each other about the axis of the outlet part.

7. An electric actuator according to claim 1, wherein the outlet part is suitable for coming into contact with a part having dynamic behavior different from the that of the outlet part, in particular a part secured to or integral with the friction part or the inlet part, when a radial force is exerted on the outlet part, said radial force being generated only while the screen is being lowered.

8. An electric actuator according to claim 1, wherein the outlet part is suitable for coming to bear against a centering member for centering the outlet part relative to the inlet part under the effect of the radial component of the resultant of the load torque exerted by the screen, while the screen is being lowered.

9. An electric actuator according to claim 1, wherein the outlet part is guided in rotation relative to the inlet part.

10. An electric actuator according to claim 1, wherein the sub-assembly formed by the inlet part and by the outlet part is centered relative to the friction part.

* * * * *